Sept. 29, 1970　　　E. M. GAUL ET AL　　　3,531,004
CROP HARVESTER HAVING REMOVABLE CROP CONTAINER
Original Filed Oct. 22, 1965　　　2 Sheets-Sheet 2
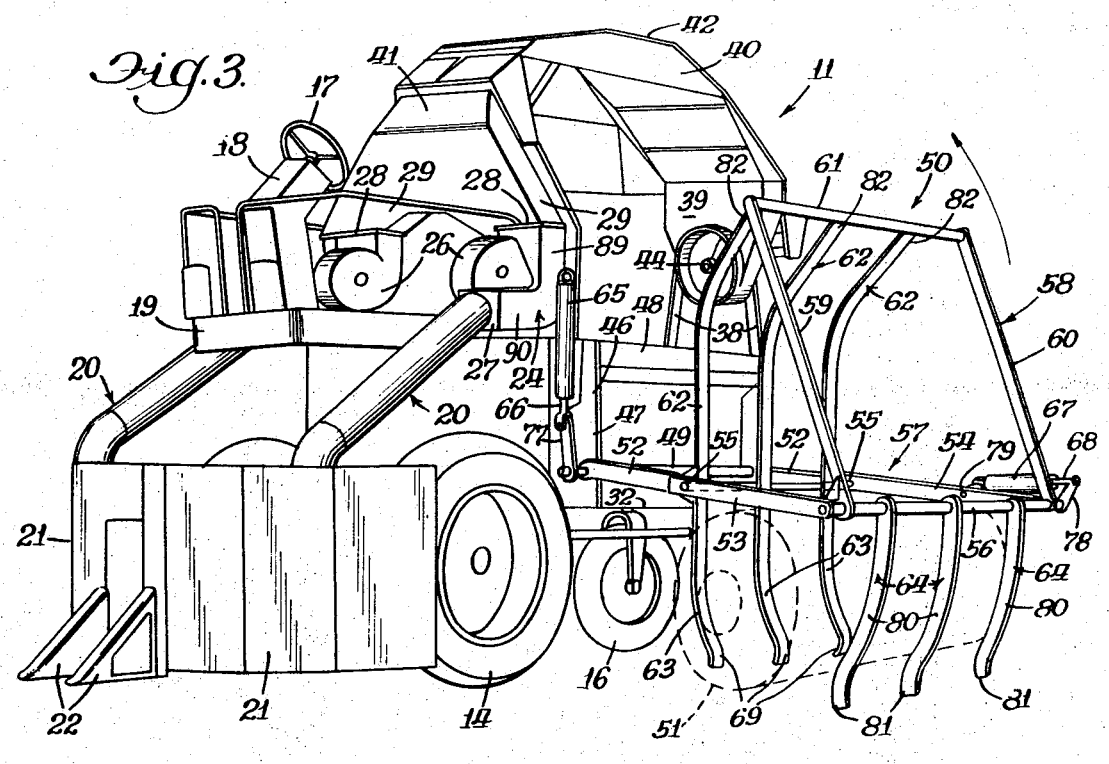
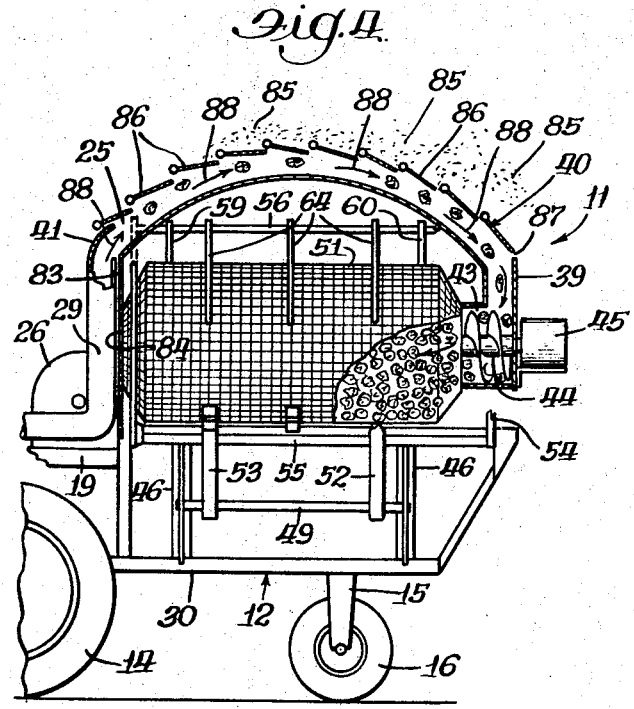
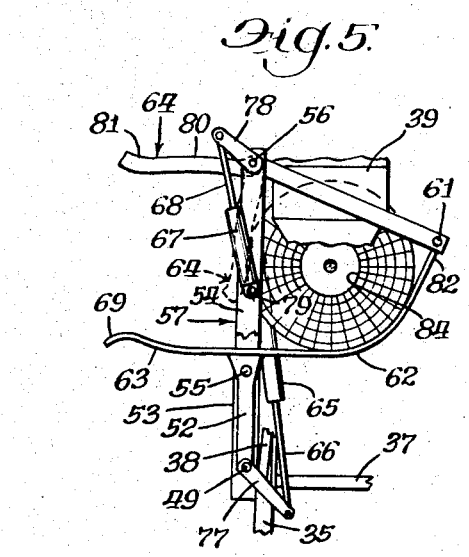
Inventors:
Richard R. Steingas
Edward M. Gaul
John J. Kowalik Atty.

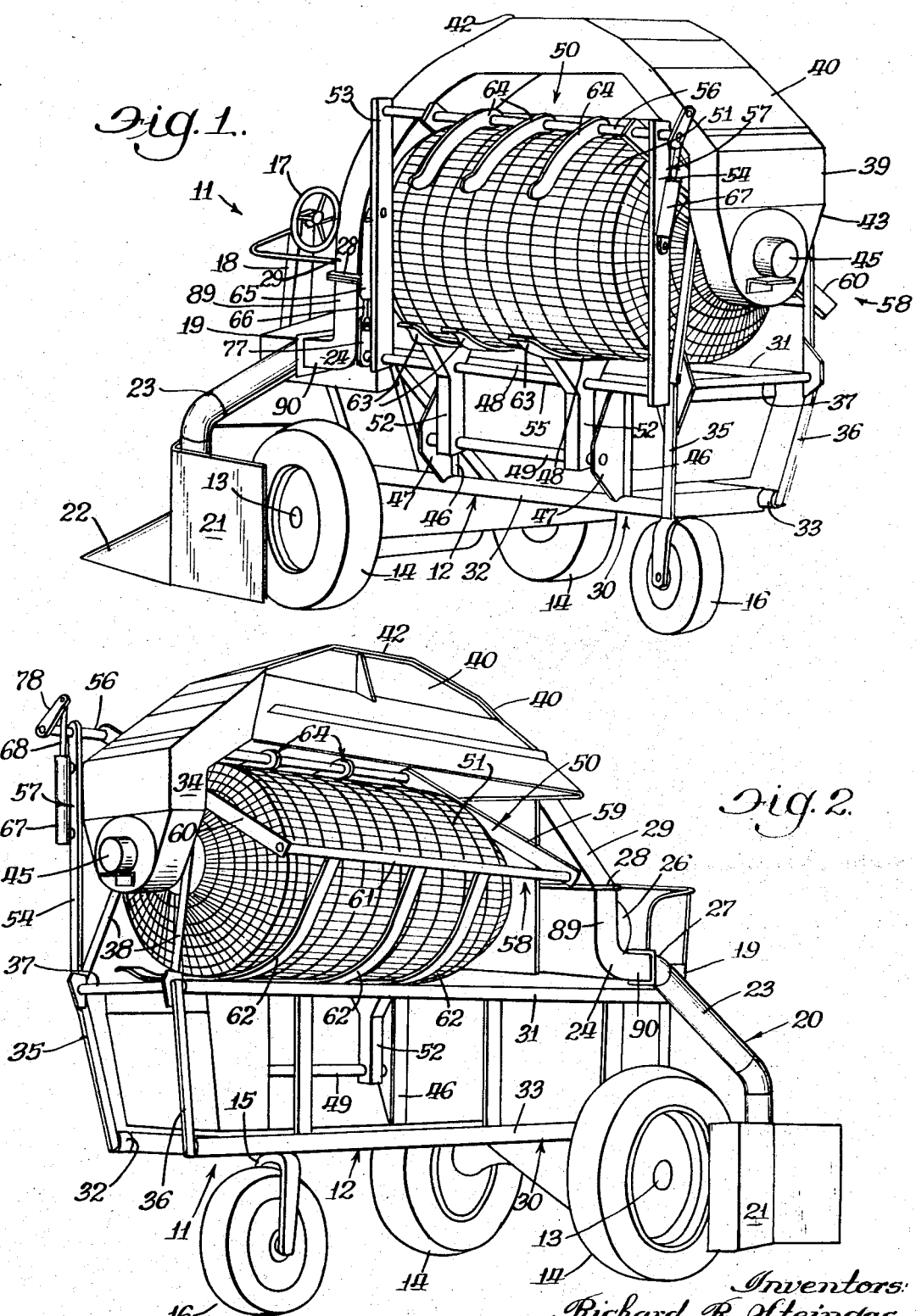

3,531,004
CROP HARVESTER HAVING REMOVABLE CROP CONTAINER

Edward M. Gaul, Naperville, Ill., and Richard R. Steingas, Memphis, Tenn., assignors to International Harvester Company, a corporation of Delaware
Original application Oct. 22, 1965, Ser. No. 501,065, now Patent No. 3,466,857, dated Sept. 6, 1969. Divided and this application Apr. 18, 1969, Ser. No. 817,507
Int. Cl. B60p 1/48
U.S. Cl. 214—147        9 Claims

ABSTRACT OF THE DISCLOSURE

A cotton harvester having a support removably mounting a receptacle on the harvester, and a cradle mechanism on the support for removing a filled receptacle and installing an empty receptacle in its place.

---

This application is a division of U.S. application Ser. No. 501,065, filed Oct. 22, 1965, for Cotton Picker Construction now Pat. No. 3,466,857 issued Sept. 6, 1969.

The instant invention relates to cotton harvesting. Particularly the invention relates to a cotton picker and a replaceable basket therefor.

A conventional commercial cotton picker comprises a self-propelled body having mounted on opposite sides thereof a pair of row units adapted simultaneously to harvest cotton from a pair of adjacent rows. Each row unit comprises a picker drum toward which cotton plants from a row being harvested are fed for aggressive separation of the cotton from such plants. A conveyor pipe serves to translocate cotton, drawn in said pipe by a conveyor fan, from an associated picker drum to a distributor duct, through which harvested cotton is blown by said conveyor fan into a common collection receptacle or basket. A conventional collection basket is mounted on the framework of its picker, being pivoted thereto to facilitate dumping of the contents at a receiving station. Such dumped cotton requires re-collection in another container to facilitate subsequent handling and translocation. The requirement to dump cotton from a collection basket for transfer to another container for translocation or handling is inefficient in the light of the present disclosure, a description of objects of which will ensue presently.

There is known prior means adapted to obviate transfer of harvested cotton from a cotton picker basket to another container. Such prior means define a basket which is removably mounted on the framework of its picker. But such prior means include a complicated mechanism for releasably securing the basket to its picker. The attendant difficulty of management of such prior device, including the demand of time for removal and replacement of a basket and consequent effect of increasing expense over that required to operate conventional devices, has in large part deterred employment of such prior means. With improved means to facilitate removably securing a basket to a cotton picker, economy in cotton harvesting could be effectuated.

To further minimize expense attendant handling of cotton upon harvesting, the relative capacity of a basket could be increased. Inasmuch as there are practical limitations to increasing basket size, the solution resides in providing means for increasing the amount of cotton that can be held by a basket. The inherent physical character of cotton permits a solution in that direction because cotton is compactible. Accordingly, a cotton picker having a basket and means for compacting cotton therein provides the solution.

It is a principal object of the instant invention to provide an improved cotton picker.

It is an additional object of the instant invention to provide in a cotton picker an improved harvested-cotton receptacle.

It is another object of the instant invention to provide in a cotton picker having a removably mounted harvested-cotton receptacle improved means for removably mounting such cotton receptacle.

It is a further object of the instant invention to provide in a cotton picker improved means for compacting cotton within the harvested-cotton receptacle.

It is yet another object of the present invention to provide a harvested-cotton receptacle adapted to be removably mounted on the framework of a cotton picker and having means for feeding harvested cotton into the receptacle opening, said feeding means serving as a compactor.

Still another object of the present invention is the provision of a cotton picker having means for aggressively removing cotton from cotton plants and feeding such removed cotton to a harvested-cotton receptacle in which the harvested cotton is compacted by the aggressive feeding parts.

It is, moreover, an object of the present invention to provide for a cotton picker a removably mounted harvested-cotton receptacle having an opening into which the cotton can be aggressively fed and compacted within the receptacle, the opening being automatically alignable with the cotton feeding means upon replacement of the receptacle.

Still a further object of the instant invention is the provision in a cotton picker and the like of a removably mounted harvested-cotton receptacle, and a rockable expandable framework by which said receptacle is held upon the cotton picker from which said receptacle is carried and released upon rocking and opening of said framework.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:
FIG. 1 is a left rear perspective view of a cotton picker embodying the present invention.
FIG. 2 is a right rear perspective view of the cotton picker shown in FIG. 1.
FIG. 3 is a left front perspective view of the cotton picker showing the releasable basket-holding structure disposed for basket release.
FIG. 4 is a left side elevational view of a part of said cotton picker, parts broken away for the purpose of illustration.
FIG. 5 is a rear elevational view of said invention.

Referring now more particularly to the drawings, there is seen a mobile cotton harvesting device or cotton picker generally designated by the numeral 11. The cotton picker 11 comprises a frame 12 arranged for harvesting in a generally fore-aft relationship. Frame 12 supports a forward axle 13 on the opposite end portions of which are mounted a pair of front traction wheels 14. The frame also supports the mounting 15 for a rear steerable wheel 16 which is adapted to be controlled by a manually operable steering wheel 17. The steering wheel 17 may be mounted on a steering post 18 carried on an operator's platform 19 supported by the frame 12 at the normally lead or forward end of the cotton picker 11 above the traction wheels 14.

The cotton picker 11 is shown as a two-row harvester, being adapted to harvest simultaneously from a pair of conventionally spaced-apart rows of cotton plants as the picker advances in a harvesting path in a cotton field. To that end, the picker 11 mounts a pair of elongated row units generally designated 20 which may be supported on the front end portion and disposed along opposite sides of said frame.

As illustrated in FIGS. 1, 2 and 3, each of the row units 20 comprises a picker drum 21 suported adjacent the ground, the picker drums 21 being spaced from each other a distance such that adjoining rows of cotton plants can be simultaneously harvested, one by each of said picker drums. Conventional plant lifter means 22 are disposed in operable relationship about a throat or entryway (not seen) through which cotton plants enter into the drums 21.

Each drum 21 may comprise a conventional mechanism in which cotton is aggressively separated from its vegetation and from which mechanism cotton is drawn through a conveyor tube 23 by a blower fan (unseen), the housing 26 of which normally communicates or is integral with the housing of a duct transition section 24. Each transition section 24 is substantially L-shaped in vertical section, comprising a horizontal part 90 and a vertical part 89 and has a pair of opposite mounting flanges 27 and 28. The lower mounting flange 27 provides the means for connecting the lower end portion of the transition section 24 to the upper end portion of the conveyor duct 23. The upper mounting flange 28 provides the means by which a corresponding transition section 24 is connected to an upwardly extending duct 29 into which cotton drawn from an associated conveyor 23 is blown by a corresponding row unit blower fan.

As illustrated in FIGS. 1, 2 and 4, the frame 12 of the instant embodiment comprises a lower frame member 30 and an upper frame member 31 which is disposed in a plane substantially parallel to the lower frame member 30. The lower frame member 30 is characterized by a pair of left and right side rails 32 and 33 which extend in a generally fore-to-aft and forwardly diverging relationship and which are disposed on opposite sides of the frame 12. Extending vertically upwardly from the aft end portions of the rails 32 and 33 are a pair of frame braces 35 and 36 which respectively define the left and right rear corners of the frame 12 and which, at their upper end portions, are rigidly secured to the transversely extending rail 37 of the frame member 31, as illustrated in FIG. 2.

As illustrated in FIG. 2, a pair of struts or braces 38 have their lower end portions secured to the frame member 31, from the aft right and left corners of which said struts or braces are projected upwardly into supporting engagement with a sheet metal hopper 39. The hopper 39 is disposed substantially midway between the sides of the picker and comprises a communicatively connected extension of a cotton cleaner housing designated 40.

The cotton cleaner housing 40 is a generally arcuate duct structure which may be mounted symmetrically with a vertical plane in which the longitudinal axis of the cotton picker 11 is disposed. In the instant embodiment, the cleaner housing 40 defines the top of the cotton picker 11 and has a passageway into the forward end 25 of which cotton 34 is blown from a common duct 41 formed by merger of the upper end portions of the ducts 29 toward the hopper 39 in the direction indicated by arrows 88, in FIG. 4.

The cleaner housing 40 may be of conventional construction, the details of which are not intended as limiting in the present invention. However, the same may have an upper opening or openings 87 in the top wall 42 in which there are mounted a plurality of adjustable grates 86, only some of which are numbered in FIG. 4 and through which debris 85 is blown outwardly from the cotton picker 11 under the blower force of the row unit fans.

A screw conveyor or auger housing 43 is connected in receiving association with the lower end portion of the hopper 39. Said housing 43 operably supports therein a mechanical compactor in the form of an auger or screw conveyor 44 which is disposed in receiving alignment with the delivery or lower end of the hopper 39 out of which cotton is fed by gravity. The auger 44 has a horizontal axis of rotation which is disposed in the plane which may define the midline of the cotton picker 11. Suitable means, which in the instant embodiment comprises a hydraulic motor 45, the housing of which is supported adjacent the auger housing 43, is connected to a hydraulic fluid source (not shown). Motor 45 may be controlled by the operator of the platform 19 and is operably connected to and in driving relationship with the auger 44.

As illustrated in FIG. 1, a pair of vertical frame ribs 46 have their lower end portions rigidly secured to the frame member 30 in spaced-apart relationship longitudinally of the longitudinal axis of the picker 11 and have their upper end portions rigidly secured to frame rail 48 which, as seen in FIG. 3, is parallel and superposed with respect to the side rail 32. Frame rail 48 is a component of the frame member 31. Each rib 46 has a laterally extending vane or mounting plate 47 which is projected to the left from the framework 12 and provides the means for anchoring one end portion of a shaft 49. The foregoing results in disposition of shaft 49 parallel to, medially and to the left of the frame rail 48. The shaft 49 rockably supports a releasable basket-holding and transferring structure generally designated as 50 which is adapted to releasably support a cotton-holding basket, bale, tube or receptacle 51 which may be of wire mesh construction and adapted to receive cotton delivered by the auger 44, in a manner hereinafter to become apparent.

Now having reference to the basket 51, when the same is disposed in cotton-receiving position, it may be circular in vertical section. In horizontal section, however, it may be ovate, being elongated in normally fore-and-aft direction. The opposite normally fore-and-aft ends are tapered toward a center; about which there are opposite end openings 84, one of which is seen in FIG. 4, and which are designed for disposition in concentric alignment with the axis of rotation of the auger. The foregoing construction provides a substantially symmetrical basket or receptacle 51 which may be loaded by the auger 44 from either end. It is appreciated by referring to FIGS. 1 and 4 that the length of the basket is substantially equivalent to the distance between the inner surfaces of the auger housing 43 and a plate 83 mounted behind the common duct 41. Therefore, cotton fed by the auger 44 into the rear opening 84 of receptacle 51 and tending to come out of the opposite or front end opening will be retained by the plate 83 which blocks the front basket opening 84.

The basket-holding structure 50 comprises a pair of rocker arms or stems 52 which are disposed vertically when the structure 50 is supporting the basket 51 in cotton-receiving position. One end portion of each of the arms 52 is journalled on the shaft 49, said arms 52 being spaced apart longitudinally of said shaft a distance calculated to provide adequate or efficient support for the basket 51 when it is being held in the basket-holding structure 50. As illustrated in FIGS. 1 and 3, the opposite ends of the arms 52 support a rectangular frame generally designated 57 and having front and rear frame rails 53 and 54, respectively, and rockably connected thereto parallel transverse rails 55 and 56, the rail 55 being journalled in spaced-apart positions in arms 52 at the end portions thereof distal from the shaft 49. The length and width of the frame 57 are such that the basket 51 may pass therethrough for a purpose which will become apparent hereinafter.

As illustrated in FIGS. 1, 2 and 3, the rail 56 is common to the frame 57, and also to another rectangular frame generally designated 58. Frame 58 is disposed at an angle of approximately 70° to the frame 57. In addition to the rail 56, the frame 58 comprises front and rear rails 59 and 60 and an integral transverse rail 61 which is parallel to the common rail 56. The angular disposition of the frames 57 and 58 is such that when they are in cotton-receiving position, the rail 61 is at a horizontal level sufficient to permit it to serve as a retainer for the basket 51 holding the same against lateral displacement or falling from the right side of the cotton picker, as clearly seen in FIGS. 2 and 4.

Extending outwardly from the opposite sides of the rail 55 are a plurality of ribs or arms, the ribs which extend to the right when the frame 57 supports the basket 51 in cotton-receiving position being identified by the numeral 62, and those extending to the left being identified by the numeral 63. By reason of the construction heretofore defined when the structure 50 supports basket 51 in cotton-receiving position, the ribs 63 extend to the left of the picker frame 12, while the ribs 62 provide what may be considered a floor, rolling support or basket seat extending across the frame member 31. The ribs 62 and 63 may be further characterized in that the arms are arranged in parallel pairs spaced longitudinally of the rail 55; and, in the embodiment shown, each rib 63 is disposed in alignment with a corresponding rib 62 transversely of said rail 55, as illustrated in FIGS. 3 and 4. Furthermore, as illustrated in FIGS. 3 and 4, the ribs 63 have free outer end portions 69 which may be spring curved, while the outer ends or portions 82 of the ribs 62 are curved toward and rigidly connected to the transverse frame rail 61 to provide a pocket in which basket 51 is held during harvesting.

A plurality of arms or ribs 64 have their inner end portions secured to the rail 56 in spaced-apart position longitudinally of said rail, the ribs 64 being mounted for rocking about the axis provided by the rail 56. The ribs 64 may have spring curved outer end portions 81 and medial offset arcuate portions 80 which have a radius of curvature equal to that of the basket 51. Thereby, said arms 64 are adapted to snugly grip basket 51. Additionally, ribs 63 and 64 may be disposed in opposed relationship in alignment in vertical planes, and the ribs 64 may be characterized as snugly engaging the left side of the basket 51 when the basket-holding structure 50 is holding the basket 51 in cotton-receiving position, as illustrated in FIG. 5.

The device operates by having the auger 44 feed harvested cotton into the aft end of a basket 51, the auger having been gravity fed from hopper 39 at a constant rate. The hopper 39 serves as a reservoir into which cotton is blown through the cleaner 42 from the ducts 29 under the action of the fans (not seen) comprising the cotton-harvesting row units 20. The cotton continues to be fed under the action of the auger 44 as the cotton picker advances in a field being harvested, until the basket is filled after which time the torque of the auger compacts the cotton in a forward direction, the plate 83 precluding spillage of the cotton through the front end basket opening 84. When the basket is sufficiently filled, the ribs 64 are rocked from the solid line position to the dotted line position of FIG. 5 by hydraulic means comprising a double-acting cylinder 67. (The dotted line position of ribs 64 is the same as that shown in FIG. 1.)

As illustrated in FIGS. 3 and 5, one end of cylinder 67 may be pivotally connected as at 79 to the rail 54. The reciprocative rod 68 of said cylinder 67 is pivotally connected to one end of a link 78, the opposite end of which is operatively connected to one end of the transverse rail 56 of the rectangular frame 57. Thereby, the ribs 64 are controlled.

Thereafter, the basket-holding structure 50 is rocked from the position illustrated in FIG. 1 to the position shown in FIG. 3 because of operation of double-acting hydraulic means comprising a hydraulic cylinder 65. As illustrated in FIGS. 3 and 5, cylinder 65 is suitably supported by frame 12. Its reciprocative rod 66 is operably connected to one end of a link 77, the opposite end of which is operably connected to the shaft 49 about which, upon operation of said cylinder 65, said frame 57 is caused to rock.

Upon rocking of the frame 57 from the position of FIG. 1 to the position of FIG. 3, the basket 51 is rolled off ribs 62 and caught and held between the ribs 63 and 64 as they are rotated into ground engagement.

It is appreciated that, while the ribs 63 and 64 are carrying basket 51 groundward, the distance between the adjacent ends of the ribs 63 and 64 is smaller than the diameter of the basket 51 so that the same will not fall. However, after the frame 57 has been rocked to engage the outer end portions 69 and 81 of the ribs 63 and 64 with the ground, the ribs 64 are rocked open farther about the rail 56 away from the ribs 63 under further arm-opening actuation of hydraulic cylinder 67. Thereby, the gap between the outer end portions of the ribs 63 and 64 is widened to a dimension greater than the diameter of the basket 51, whereupon rocking the frame 57 upwardly, the basket-holding structure 50 will be moved away from the basket 51 which is thereby released. That basket, with the cotton therein contained, may be then manually removed, and an empty basket positioned in its place.

Thereafter, the basket-holding structure 50 may again be rocked about shaft 49 to carry the ribs 63 and 64 into ground engagement about the new basket. The ribs 64 may then be actuated by the hydraulic means comprising rod 68 to partially close the ribs 64 into basket-holding position by narrowing the gap between the ribs 63 and 64, and the frame 57 returned to the position shown in FIG. 1 by actuation of hydraulic rod 66, whereby the new basket is lifted from the ground.

By then moving rod 68 to the position shown in FIG. 4, the new basket will be rolled from between the ribs 63 and 64 into its cotton-receiving seat in which it is gripped between ribs 62 and 64.

What is claimed is:

1. In a harvester of the class adapted for temporary storage of crops in a receptacle, frame means on the harvester defining a position for a removably mounted receptacle, means supported on the frame means for removably supporting the receptacle in said position and for pumping the receptacle when filled and replacing the same with an empty receptacle comprising a cradle mechanism, means mounting said cradle mechanism on the frame for rocking movement about two generally parallel horizontal fore and aft axes between a receptacle dumping position and receptacle mounting position including arm means rockably mounted to said frame about a generally horizontal fore and aft axis and said cradle mechanism being pivotally mounted about a horizontal axis to the free ends of said arm means, said cradle mechanism in said mounting position having a portion substantially horizontally disposed below a receptacle for supporting the same and said cradle portion in said dumping position disposed substantially vertically to permit the receptacle to be dumped therefrom, and means for translationally moving the receptacle relative to the cradle when said cradle is in said horizontal position.

2. The invention according to claim 1 and said cradle movable to and from said space through an open side of the frame means and having opposed receptacle-embracing portions, and means for locking said portions in receptacle-embracing position and unlocking said portions for discharging a receptacle.

3. The invention according to claim 2 and said means for dumping and replacing a receptacle comprising a hydraulically operated ram connected between said means mounting the cradle and the cradle for tilting the cradle between container-dumping and supporting positions.

4. The invention according to claim 2 in which the cradle in supporting position has its arm means disposed below a container and the means for translationally moving the container above the container and in dumping position said arm means and last-mentioned means are disposed substantially vertically and providing at their lower ends a container-exit space therebetween.

5. The invention according to claim 2 and said arm means and translationally moving means having distal extremities offset toward each other.

6. The invention according to claim 2 and means pivotally mounting said means for translationally moving the container for swinging movement toward the arm means in container-embracing relation therewith and for swinging away from the arm means for releasing a container.

7. The invention according to claim 6 and said means mounting the cradle intermediate its ends for swinging movement between container-supporting position and container-dumping position and providing a support for a container at one side of one of said axes.

8. The invention according to claim 1 and said means for translationally moving the receptacle comprising ribs connected at one of their ends to the cradle and diverging toward their other ends with respect to said portion of the cradle and providing a container-accommodation space therebetween.

9. The invention according to claim 8 wherein one of said ribs are swingable toward and away with respect to said portion of the cradle.

References Cited

UNITED STATES PATENTS

| | | | |
|---|---|---|---|
| 2,745,562 | 5/1956 | Van Demark et al. | 214—77 |
| 2,803,847 | 8/1957 | Hobbs | 214—83.28 X |
| 2,876,816 | 3/1959 | Busch et al. | 214—77 X |
| 3,033,397 | 5/1962 | Busch. | |
| 3,057,490 | 10/1962 | Sauer | 214—77 |
| 3,278,055 | 10/1966 | Stoltz | 214—77 |
| 3,355,043 | 11/1967 | Talbert | 214—77 X |

GERALD M. FORLENZA, Primary Examiner

R. J. SPAR, Assistant Examiner

U.S. Cl. X.R.

214—77